April 14, 1970     R. L. DE BIASSE     3,505,934
PISTON FOR INTERNAL COMBUSTION ENGINE
Filed Jan. 10, 1969
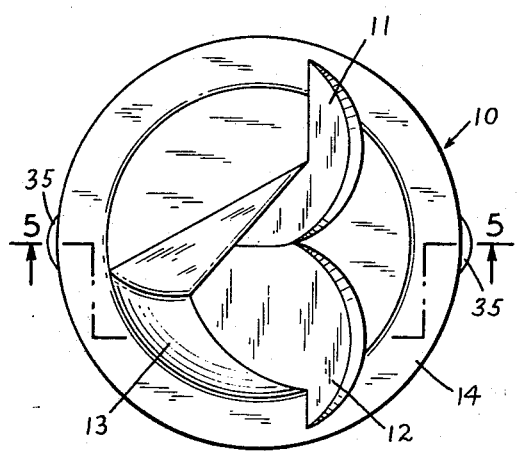
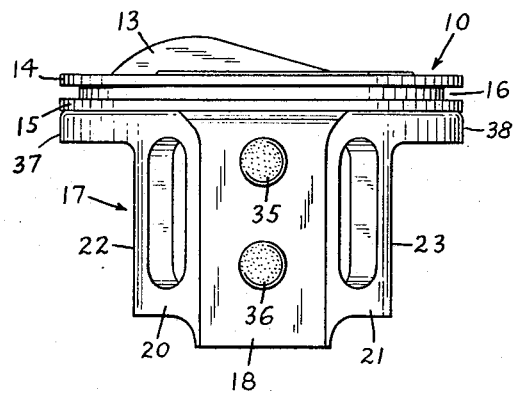
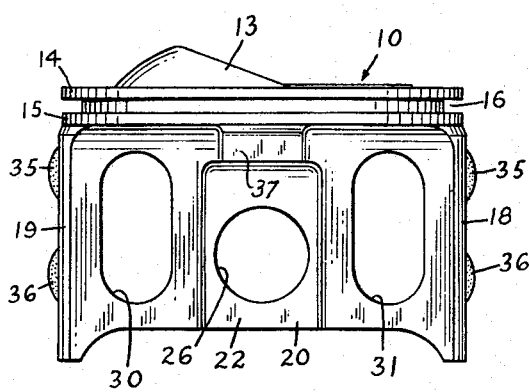
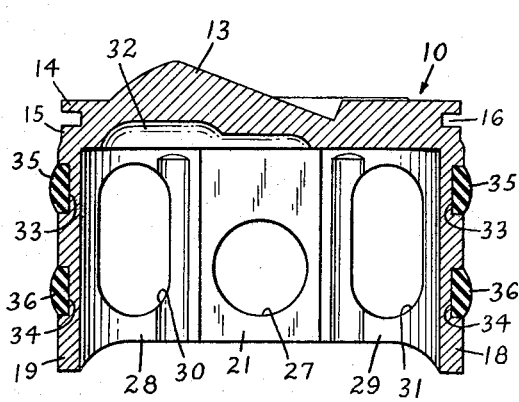
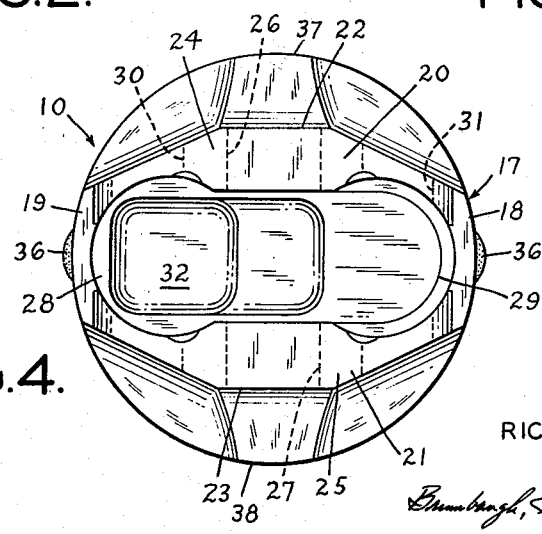
INVENTOR
RICHARD L. DE BIASSE
BY
HIS ATTORNEYS

United States Patent Office 3,505,934
Patented Apr. 14, 1970

3,505,934
PISTON FOR INTERNAL COMBUSTION ENGINE
Richard L. De Biasse, 3 Oak St., Madison, N.J. 07940
Continuation-in-part of application Ser. No. 669,905,
Sept. 22, 1967. This application Jan. 10, 1969, Ser.
No. 798,853
Int. Cl. F16j 1/04
U.S. Cl. 92—239                        11 Claims

ABSTRACT OF THE DISCLOSURE

This invention relates to a light weight piston for an internal combustion engine, the piston having not more than two piston ring grooves and a skirt having antifriction pads therein engageable with the cylinder wall of the engine at narrow zones substantially in a plane perpendicular to the axis of the piston pin for the piston, the skirt being spaced from the cylinder wall between the zones to reduce friction losses between the piston and the cylinder wall.

---

This application is a continuation-in-part of my copending application S.N. 669,905 filed Sept. 22, 1967 and now abandoned.

In internal combustion engines for passenger cars, sports cars and racing cars, higher engine speeds and higher compression ratios have been provided to enable high vehicular speeds and at the same time maintain relatively low engine weights and high engine efficiencies. For that reason, many engines utilize either lightweight steel, aluminum alloy or bimetallic pistons or reduce inertia forces and avoid overstressing the engine components. Nevertheless, a satisfactory compromise between piston strength, piston speed and reduction of friction between the piston and cylinder walls has not been achieved in actual practice. Almost all pistons are provided with at least three piston ring grooves to receive compression, wiping and oil rings. The presence of these rings in the head and the skirt of the piston causes considerable friction loss in the engine, despite the presence of oil on the cylinder walls, which result in a substantial loss of horsepower at increasing engine speeds.

In accordance with the present invention, I have found that the number of piston rings on a piston and the amount of contact surface between the piston and the cylinder wall can be reduced very substantially without greatly increased oil consumption, particularly in engines of the high r.p.m. type utilized for racing, high speed turnpike cruising and the like.

In accordance with the present invention, a piston is provided which has a piston head containing not more than two piston ring grooves for receiving single or multiple rings and a skirt having only narrow zones constituting a minor proportion of the circumference of the piston which are to be disposed adjacent the cylinder wall while the remainder of the skirt is spaced a substantial distance radially from the wall of the cylinder, thereby to facilitate cooling of the piston by contact with the oil in the engine and also to reduce weight and friction between the piston and the cylinder wall. Narrow zones of the skirt disposed adjacent the cylinder walls are located on opposite sides of the wrist pin for the connecting rod and in a plane substantially perpendicular to the axis of the wrist pin. To reduce friction between the piston and the cylinder wall and stabilize the piston in the cylinder, the narrow zones of the skirt of the piston are provided with areas of antifriction material, such as, for example, Teflon, a fluorocarbon, such as tetrafluoropolyethylene, which has high temperature resistance and a very low coefficient of friction, these areas projecting sufficiently beyond the skirt of the piston so that in effect the only portions of the piston other than the anti-friction material in contact with the cylinder wall are the ring or rings carried by the piston and small areas at the ends of the piston pins. In this way, friction between the piston and the cylinder wall is reduced to a minimum, the weight of the piston and its inertia forces are reduced materially and practically the whole underside of the piston head is exposed to the oil and the lower temperatures in the crankcase and inner ends of the cylinders, thereby to cool the piston head and prevent it from burning in use.

For a better understanding of the present invention, reference may be had to the accompanying drawings, in which:

FIGURE 1 is a top plan view of a typical piston embodying the present invention;
FIGURE 2 is a side elevational view thereof;
FIGURE 3 is an end elevational view thereof;
FIGURE 4 is a bottom plan view thereof; and
FIGURE 5 is a view in section taken on line 5—5 of FIGURE 1.

The form of piston chosen for purpose of illustration is suitable for use in a .289 cubic inch engine of the type manufactured by the Ford Motor Company and includes a circular piston head 10 which may be provided with valve relief slots 11 and 12 and a dome 13 depending upon the desired compression ratio of the engine. In lower compression engines, the relief slots 11 and 12 and the dome can be omitted, if desired.

As shown in FIGURES 2, 3 and 5, the head 10 is of shallow axial extent and comprises a pair of lands 14 and 15 and an interposed piston ring groove 16. As best shown by FIG. 5, the circumferential exteriors of lands 14 and 15 conform to a cylindrical surface extending between and limited in axial extent by parallel top and bottom planes such that said surface and said planes define a disc to which the radially outward portion of head 10 conforms in shape. The radius of such disc is, as shown, at least three times greater than the thickness thereof between said top and bottom planes. As further indicated by the drawings, groove 16 is disposed between lands 14 and 15 to be intersected by a plane parallel to and midway between the mentioned top and bottom planes, and the thickness of said disc between those top and bottom planes is, as shown, between three and four times the width at the mentioned cylindrical surface of the groove 16. The groove 16 may be of sufficient width to receive a single compression ring or several thinner compression rings or the head may be enlarged to include two grooves for receiving a single or multiple compression ring assembly and a single or multiple oil ring assembly. Not more than two grooves should be provided in the head 10.

Extending from the head is a skirt 17 including two narrow arcuate skirt portions 18 and 19, each, in the piston disclosed, about 1⅜ inches wide. For engines having a larger cylinder bore or a smaller cylinder bore, the arcuate portions may be made wider or narrower, substantially in proportion to the change in size of the piston. As shown in FIGURE 4, the arcuate portions 18 and 19 are concentric with the piston head 10 and have about the same or slightly longer radius of curvature. The ends of the arcuate skirt portions 18 and 19 are joined by other skirt portions or webs 20 and 21 which extend generally chord-wise of the piston and have outermost surfaces 22 and 23 spaced radially inwardly from the edges of the piston head and correspondingly spaced from the cylinder wall of the engine. Each of the chord-wise webs 20 and 21 has a thickened mid-portion 24 and 25 forming wrist pin bosses provided with aligned openings 26 and 27, for receiving the wrist pin. The inner surfaces of the bosses 24 and 25 are spaced far enough apart to receive the end of the connecting rod of the engine. It will be understood that the openings 26 and 27 may be provided with wrist pin bushings of suitable type.

At the outer ends of and between the skirt portions or webs 20 and 22, are parallel, longitudinally extending bores 28 and 29 to provide connecting rod clearances. Oblong holes 30 and 31 are formed in the webs for reducing the weight of the piston. Also, the head of the piston has milled or otherwise formed recesses 32 under the dome portion 13 to render the head substantially uniform in thickness and thereby provide more uniform heat absorption through the head of the piston.

It will be apparent that when the piston is disposed in a cylinder, the rings in the piston ring groove 16 will engage the cylinder wall, and the arcuate skirt portions 18 and 19 will be adjacent to, but somewhat out of contact with, the wall of the cylinder. Each of the arcuate portions is provided with one or more recesses 33 and 34 for receiving disk-like domes or pads 35 and 36 of temperature resistant anti-friction plastic, such as, for example, Teflon. The pads project beyond the surfaces of the arcuate skirt portions about .020 inch and their maximum diametric spacing is slightly greater than the cylinder diameter whereby the pads 35 and 36 are compressed and maintain the skirt portions 18 and 19 out of contact with the cylinder wall. Teflon pads of the type described are capable of withstanding temperatures as high as 500° F. without softening or damage, which is considerably higher than the cylinder wall temperature or the temperature of the oil or oil mist which is present in the crankcase and inner ends of the cylinders of the engines. It will be understood that a single elongated pad or a coating of Teflon bonded to an outer surface area of the skirt portions 18 and 19 may be used instead of the two disk-like pads 35 and 36.

Any instability of the piston in the axis of the piston pin can be overcome by providing narrow skirt areas 37 and 38 of arcuate shape below the land 15 of above the pin openings 26 and 27. The areas 37 and 38 may also be provided with Teflon pads or coatings of antifriction material, such as Teflon.

Due to the open formation of the skirt 17 and its spacing from the cylinder wall throughout a major portion of its area, better cooling of the piston head by the oil mist and better transfer of heat from the cylinder head 10 to the oil is achieved than with pistons having full length and full diameter skirts of the type provided heretofore. Moreover, by positioning the skirt webs 20 and 21 closer to the center of the piston, less reinforcement for the wrist pins bosses is required, thereby enabling the overall weight of the piston for a given cylinder size to be reduced further. Moreover, the inertia forces resulting from reciprocation of these pistons are lower and the friction losses between the piston and piston ring and the cylinder wall are substantially reduced so that the operating r.p.m. and horsepower output of an engine of a given piston displacement and compression ratio can be increased without danger of overstressing the components of the engine.

As indicated above, in many instances a single piston groove is adequate for racing and sports car engines, but if oil consumption is a problem, it can be overcome by providing an additional ring groove and oil rings in the piston.

I claim:

1. In a piston comprised of a circular head, a pair of part-way-round skirts depending from diametrally opposite peripheral portions of the bottom of said head, and wrist pin mounting means coupled to and disposed beneath said head, the improvement in which the radially outward portion of said head conforms in shape to a disc defined by top and bottom parallel planes normal to the axis of said piston and by a circular cylindrical circumferential surface extending between and limited in axial extent by said planes, said disc has a radius at least three times greater than the thickness thereof between said planes, said head has formed in the circumference thereof a single annular recess providing a seat for a plurality of piston rings, said recess being intersected by a plane parallel to and midway between said top and bottom planes, and the axial thickness of said disc between said top and bottom planes being between three and four times the axial width of said recess at the radially outward opening thereof.

2. The improvement as in claim 1 in which said head is characterized at the top thereof by an upwardly salient convex dome radially inward of the circumference of such head, said head also being characterized by valve relief slots formed in the top of said head and adjacent to said dome.

3. The improvement as in claim 2 in which said head is characterized beneath said dome by a concavity formed in the bottom of said head to compensate for the thickness added to said head by said dome.

4. In a metal piston comprised of a circular piston head with a cylindrical circumferential surface defined between and limited in axial extent by top and bottom planes each normal to the piston axis, said piston being further comprised of a pair of partway-round metal skirts each having an angular extent of less than 90° around said head and integral with and depending from diametrally opposite peripheral portions of the bottom of said head, the improvement comprising, metal web means integral with an depending from the bottom of said head and laterally extending between said skirts to be integrally joined therewith by end regions of said web means, said web means having a laterally and transversely central region disposed between said end regions and characterized by transversely opposite outwardly-presented vertical side faces spaced radially inwards of said circumferential surface, said central region of said web means being formed of metal exceeding in its thickness between said faces the combined radial thicknesses of said skirts, and said central region of said web means being apertured in downwardly spaced relation from said bottom plane and from one to the other of said faces to receive a wrist pin and to provide room beneath said head for the top of a connecting rod coupled by said pin to said piston, and further comprising a pair of downwardly salient part-way-round vestigial skirts disposed at the periphery of said head mid-way between said first-named skirts, said vestigial skirts being integral with said dependent from diametrally opposite peripheral portions of the bottom of said head, and said vestigial skirts each having an angular extent around said head of less than 90° and an axial extent smaller than that of said first-named skirts.

5. The improvement as in claim 4 in which said web means comprises a pair of transversely spaced webs each having laterally opposite end portions respectively joined integrally with opposite ones of said skirts and each having a central portion which is transversely thickened relative to such end portions of such web, each of the respective central portions of said two webs having formed therein a respective one of two coaxial transversely aligned apertures for respectively receiving a corresponding one of the two ends of said pin.

6. The improvement as in claim 5 in which the two web end portions which are joined to each skirt each make an angular junction with such skirt and diverge from each other in the radially inward direction from the points of junction of such end portions with the central portions of the corresponding webs.

7. The improvement as in claim 5 in which each of the end portions of said webs has a lightening hole formed therein.

8. The improvement as in claim 4 in which said vestigial skirts are provided by the respective radially-outward ends of pair of ribs formed on the bottom of said head.

9. The improvement as in claim 4 in which the radially-outward portion of said head conforms in shape to a disc defined by said cylindrical surface and said top and bottom planes, said disc having a radius at least three times greater than the axial thickness of said disc between such planes, said head has formed in the circumference thereof a single annular recess providing a seat for a plurality of piston rings, said recess being intersected by a plane parallel to and midway between said top and bottom planes, and the axial thickness of said disc between said top and bottom planes being between three and four times the axial width of said recess at the radially-outward opening thereof.

10. In a piston comprised of a circular head, a pair of part-way-round main skirts integral with and depending from diametrally opposite peripheral portions of the bottom of said head, each of said main skirts having an angular extent around head of less than 90° and wrist-pin mounting means coupled to said head and disposed centrally thereof beneath the bottom thereof, the improvement comprising, a pair of vestigial downwardly salient part-way-round skirts disposed at the peripheral region of said head, said vestigial skirts being integral with said head and depending from diametrally opposite peripheral portions of the bottom of said head which are between said main skirts, each of said vestigial skirts having an angular extent around said head of less than 90° and having an extent in the axial direction of said piston which is less than that of said main skirts.

11. The improvement as in claim 10 in which said vestigial skirts are provided by the respective radially outward ends of a pair of corresponding ribs formed on the bottom of said head.

References Cited

UNITED STATES PATENTS

| | | | |
|---|---|---|---|
| 1,283,021 | 10/1918 | Anderson | 92—239 X |
| 1,526,491 | 2/1925 | Cox | 92—239 X |
| 2,817,562 | 12/1957 | Fleming et al. | 92—212 X |
| 3,115,070 | 12/1963 | Tsang | 92—212 |

OTHER REFERENCES

Hot Rod Magazine, May 1967, pages 54 and 55.

CARROLL B. DORITY, JR., Primary Examiner

U.S. Cl. X.R.

92—212